July 7, 1970    W. T. McMICHAEL    3,519,708
METHOD OF FORMING SELECTIVELY PERMEABLE BODIES
FROM FLEXIBLE POLYURETHANE FOAM
Filed Nov. 21, 1966

INVENTOR.
Wallace T. McMichael
BY
*Robert B. Ingraham*
AGENT 3,519,708
METHOD OF FORMING SELECTIVELY PERMEABLE BODIES FROM FLEXIBLE POLYURETHANE FOAM
Wallace T. McMichael, Lake Jackson, Tex., assignor to The Dow Chemical Company, Midland, Mich., a corporation of Delaware
Filed Nov. 21, 1966, Ser. No. 595,934
Int. Cl. B29d 3/02
U.S. Cl. 264—321            3 Claims

ABSTRACT OF THE DISCLOSURE

Flexible open-celled polyurethane foam is impregnated with a hardenable epoxy resin and a portion of the foam collapsed to form a solid portion and the hardenable epoxy resin cured to produce selectively permeable bodies.

---

This invention relates to selectively porous bodies and to a method for the preparation thereof and more particularly relates to selectively porous bodies of synthetic resins open celled foam.

Oftentimes, it is desirable to provide bodies having selective porosity, that is, bodies which are porous only in desired areas. Such bodies oftentimes are useful as filters, distributors, dispensing heads, dispensing conduit and the like. Usually in the preparation of selectively porous bodies such as filters, dispensing conduits and the like, it is necessary to prepare a porous body and clamp or fasten the porous body to a support in such a manner that it is retained in the desired position. Frequently, the techniques required for fabricating such articles are expensive and time consuming, require a diverse variety of materials. For example, an organic filter element such as open celled foam fibrous mat or the like, a support means to prevent undesired deformation of the element and a means to secure the porous element to a body are required to provide a selectively porous structure. By the term porous body is meant a body which is permeable to a gas or liquid and permits the flow of a gas or liquid therethrough. The term porous as used herein does not contemplate a plurality of closed noninterconnecting cells which are impermeable to fluid flow.

It would be advantageous if there were available an improved permeable selectively porous body having a generally homogeneous composition.

It would also be advantageous if there were available an improved method for the preparation of synthetic resinous porous bodies.

It would also be advantageous if there were available an improved method of preparation of synthetic resinous selectively porous bodies which would permit a wide latitude of operation in the preparation thereof.

It would also be beneficial if there were available improved selectively porous bodies of a synthetic resinous composition which were resistant to chemical attack.

These benefits and other advantages in accordance with the present invention are achieved in a method for the preparation of a selectively porous body. The steps of the method comprising; impregnating an open celled flexible foam with a settable resin and curing agent therefor, expressing excess resin from the foam and leaving a small quantity of resin coating in the open cells, the quantity of resin being insufficient to fill the cells, forming the resin coated flexible foam into a desired shape, allowing a selected portion of the open cell foam to retain the open cells and collapsing a selected portion of the foam to form a substantially continuous nonporous portion and effecting the cure of the settable resin.

Also contemplated within the scope of the present invention is an improved selectively porous body comprising a porous portion of a lightweight flexible foam having open cells coated with a thin film of a hardened resin and a curing agent therefor, and an impervious portion comprising a collapsed portion of the foam wherein the cell walls are adhered together by the hardened resin.

Settable flexible foamed resins are disclosed in U.S. Letters Pat. No. 3,269,887 wherein a flexible foam is impregnated with a settable resin. An impregnated flexible foam containing sufficient resin to wet the surfaces of the open cells is deformed to provide a desired configuration and the resin is caused to cure or set imparting a permanent configuration to the resultant structure. Suitable flexible open celled foams, hardenable resins and the like are disclosed in U.S. Pat. No. 3,269,887, employing the hereinbefore described settable foams. A variety of highly useful products are readily fabricated.

The benefits and advantages of the present invention will become more apparent from the following specification taken from the drawing wherein.

Figure 1:
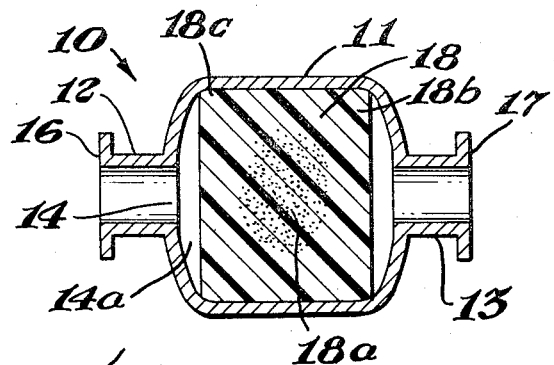
FIG. 1 is a sectional view of an article in accordance with the present invention.

In FIG. 1 there is illustrated a pipe line filter in accordance with the present invention generally designated by the reference numeral 10. The filter 10 comprises a body or housing 11. The housing 11 has a first end 12 and a second end 13. The body 11 defines therein an internal passageway 14 extending from the first end 12 to the second end 13. The passageway 14 defines an enlarged portion 14a lying between the first end 12 and the second end 13. Flanges 16 and 17 are formed by the body 11 at the first end 12 and second end 13, respectively, to facilitate coupling or connection to a piping system. Disposed within the enlarged portion 14a or of passage cavity 14 is a hardened or rigid flexible foam filter element 18. The element 18 is a selectively porous body having porous region 18a and impervious regions 18b and 18c.

The filter 10 beneficially is formed by providing a housing such as the housing 11 which may be of metal, synthetic resin or a composite of synthetic resin and a reinforcing material such as filamentary glass. Beneficially, a portion of a flexible open celled foam such as flexible polyurethane foam is impregnated with a settable resin such as an epoxy resin. The excess resin is squeezed or otherwise removed from the flexible foam body so that only a thin coating of the hardenable resin remains on the surface of the open cells. The flexible foam body is then inserted within the passageway 14 and positioned within the enlarged portion of the passage 14a. Advantageously the impregnated foam has a dimension slightly greater than the enlarged portion 14a of the passage 14 and portions 18b and 18c are collapsed to a sufficient degree to provide an adhering and sealing quantity of the hardenable resin adjacent the inner surface of the body 11. Subsequent curing of the resin is accomplished by the addition of a hardening agent such as boron trifluoride for an epoxy resin, if the hardening agent is not present originally in the resin with which the open called flexible foam was impregnated. Heat or time provides hardening of the resin thereby providing a rigid porous structure firmly disposed and adhered within the housing 11 and providing a selectively porous body in accordance with the invention.

Beneficially by selecting a flexible foam of a desired cell size almost any desired degree of porosity is obtained. The porosity can be varied to some extent by the amount of the hardenable resin which is added to the flexible foam and to some extent by the degree of compression under which the foam is permitted to set. If the impregnated foam is cured while in the completely collapsed stage nonporous portions such as the portions 18b and 18c are obtained.

Figure 2:
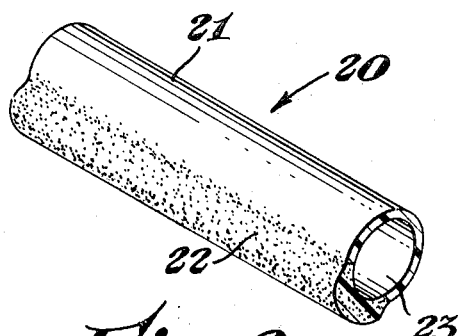
FIG. 2 is a view of a distribution conduit prepared in accordance with the present invention.

In FIG. 2 there is depicted a selectively porous element generally designated by the reference 20. The selectively porous element 20 has a generally elongate cylindrical configuration and comprises an impervious body portion 21 and a pervious or porous body portion 22. The element 21 defines an internal longitudinal passageway 23. The pervious portion 22 provides communication between the passageway 23 and the space external to the element 20. Beneficially selectively pervious bodies such as the body 20 in the form of conduits are advantageously employed for the distribution of liquids in trickle filters, gas-liquid contact apparatus, seepage conduits, ventilating systems, spargers, and the like. A body such as the body 20 is readily formed employing apparatus generally as shown in FIGS. 3 and 4.

Figure 3:
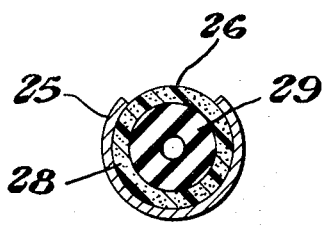
FIGS. 3 and 4 depict one method of the formation of articles according to the invention.

In FIG. 3 there is depicted mold 25. Mold 25 comprises a portion of a cylinder wherein a sector of the cylindrical wall has been removed to form a longitudinal opening 26. A flexible open celled body 28 is disposed within the mold 25. The body 28 has been treated with a hardenable resin substantially as set forth in U.S. Pat. 3,269,887. An expandable mandrel 29 is disposed within body 28 which is of a hollow cylindrical configuration. The mandrel 29 is adapted to be expanded mechanically or alternately by fluid pressures such as gas or liquid. Advantageously such a mandrel can comprise an elastomeric tube which on the application of internal pressures will expand to an extent sufficient that its outer dimension approximates that of the inner dimension of mold 25.

Figure 4:
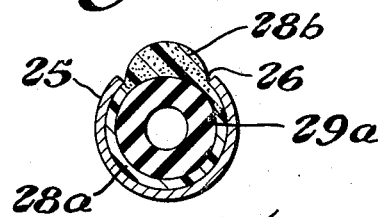

In FIG. 4 the mandrel 29 is expanded to form the enlarged mandrel 29a. The foamed body 28 is compressed in the region 28a and uncompressed in the region 28b. Compression of the body 28 in the region 28b causes collapse of the cell walls and contact of adjacent cell walls with each other and in curing of the resin impregnating the flexible foam body, the region 28 forms a rigid, impermeable region. The uncompressed portion 28b has open cells which provide a passage from the interior of the body to the exterior and which on curing or hardening of the settable resin provide an area or region of desired porosity.

Employing the method of the present invention, it is readily seen that the selectively porous bodies are obtained which can be of essentially constant composition and chemical properties.

Figure 5:
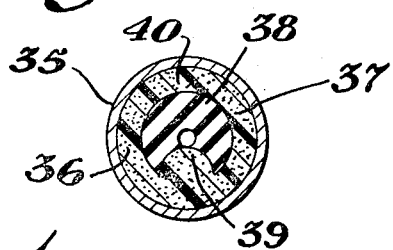
FIGS. 5 and 6 depict an alternate method of preparing the articles in the present invention.
Figure 6:
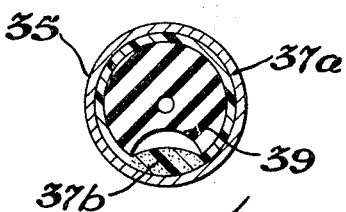

In FIGS. 5 and 6 there is depicted an alternate method of forming a selectively permeable conduit or body in accordance with the invention. In FIG. 5 there is shown a hollow cylindrical mold generally designated by the reference number 35. The hollow mold 35 has an internal cavity 36. Within the cavity 36 is an impregnated open celled flexible foamed body 37 having a hollow cylindrical configuration disposed within the impregnated body 37 is an expandable mandrel 38. The mandrel 38 comprises a nonexpandable or rigid portion 39 and a flexible deformable portion 40. The deformable portion 40 is adapted to expand and generally fill the cavity 36 on the application of internal pressure.

In FIG. 6 there is depicted the mold 35 having disposed therein the body 37 after compression by the mandrel to form a collapsed portion 37a and an uncollapsed portion 37b. The rigid portion 39 of the mandrel serves to contain the uncompressed portion 37b and prevent collapse of the cells. On curing of the settable resin, the portion 37a is impervious while the portion 37b is pervious and the external configuration of the resultant conduit is generally cylindrical. The cylindrical configuration is oftentimes desirable wherein the selectively permeable conduit is to be employed with conventional pipe fittings or tubing connections.

Figure 7:
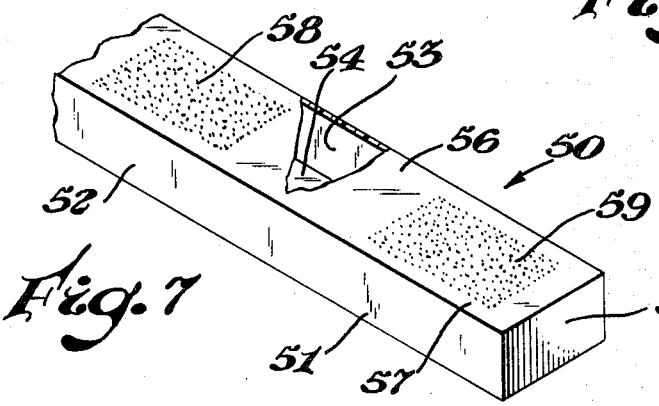
FIG. 7 is a schematic representation of an air-duct employing a selectively porous article in accordance with the present invention.

In FIG. 7 there is depicted a view of a gas distributing generally designated by the reference numeral 50. The conduit 50 comprises an impermeable trough 51. The trough 51 has sides 52 and 53, a bottom 54 and an end 55. A selectively permeable body 56 forms a face of the conduit opposite the bottom 54. The selectively impermeable body comprises an impervious region 57 and pervious or permeable regions 58 and 59. The selectively pervious portion 56 is formed by the impregnation of the flexible open celled foam with a settable resin and compression of the flexible foam in the region 57 as the settable resin is cured, thereby adhering the celled walls together into a generally solid impermeable member while leaving the cells open in the regions 58 and 59.

Advantageously the method of the present invention permits forming selectively permeable articles of almost any desired shape and form by choosing a suitable foam and impregnating resin.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of selectively permeable porous bodies, the steps of the method comprising
    impregnating a body consisting essentially of an open celled synthetic resinous flexible polyurethane foam with a hardenable epoxy resin and a curing agent therefor,
    expressing excess resin from the foam and leaving a small quantity of resin coating the open cells, the quantity of resin remaining being insufficient to fill the cells,
    deforming the resin-coated flexible foam into a desired shape,
    compressing a portion of the foam to form a substantially continuous nonpermeable portion and a permeable portion retaining the open cells and
    effecting the cure of the hardenable epoxy resin, thereby providing a body having porous and nonporous portions.

2. The method of claim 1 wherein the resin-coated flexible foam is shaped into a generally cylindrical configuration, compressed and the compressed portion of the foam is generally axially disposed.

3. The method of claim 1 wherein the portion of the foam to be compressed is compressed between matched dies.

References Cited

UNITED STATES PATENTS

| | | | |
|---|---|---|---|
| 2,945,262 | 7/1960 | Petty | 18—55 |
| 2,666,954 | 1/1954 | Potter | 18—59 |
| 3,000,464 | 9/1961 | Watters | 181—33 |
| 3,242,239 | 8/1961 | Schafer | 264—36 |
| 3,306,967 | 8/1963 | Turkewitsch | 264—321 |
| 3,269,887 | 8/1966 | Windecker | 161—160 |

FOREIGN PATENTS 911,427   11/1962   Great Britain.

JULIUS FROME, Primary Examiner

P. A. LEIPOLD, Assistant Examiner

U.S. Cl. X.R.

55—502, 524, 529; 161—160; 264—45